3,299,031
PROCESS FOR THE MANUFACTURE OF
POLYBUTADIENE
Nikolaus Schön and Gottfried Pampus, Leverkusen, and Josef Witte, Cologne-Stammheim, Germany, assignors to Farbenfabriken Bayer Aktiengesellschaft, Leverkusen, Germany, a corporation of Germany
No Drawing. Filed Aug. 7, 1962, Ser. No. 215,295
Claims priority, application Germany, Aug. 19, 1961,
F 34,737
11 Claims. (Cl. 260—94.3)

The present invention relates to a process for the manufacture of polybutadiene. More specifically, the invention relates to an organometal catalyzed polymerization of 1,3-butadiene and to a rubbery polymer having an improved processability.

Numerous processes for the polymerization of butadiene-1,3 using organic metallic catalysts have been described in the literature. Depending on the catalyst used, the resulting polymers differ in their steric composition, i.e. in the kind of linkage connecting the monomer units. Thus with lithium catalysts, butadiene polymers are obtained in which about 50 percent of the monomer units are linked in the 1,4-cis position, 40 percent in the 1,4-trans position and 10 percent in the 1,2 position. Butadiene polymers containing more than 90 percent 1,4-cis links are obtained using mixed catalysts containing titanium tetraiodide or cobalt. In spite of the great differences in the steric build-up, these polymers are to a certain extent very similar to each other in their technical properties. Thus all the butadiene polymers so far described have a very low film strength as raw material. Owing to the low self-adhesiveness of the raw materials, the polymers tend to crumble when rolled this occurring within a wide range of temperatures, so that fillers in mixtures prepared from these polymers are poorly distributed.

Owing to this difficulty in processing these polymers, mixtures based on pure polybutadiene cannot be manufactured on an industrial scale. The types of polybutadiene hitherto described can only be processed when blended with natural rubber or styrene-butadiene copolymers or synthetic cis-1,4-polyisoprene, which impairs the characteristic properties of polybutadiene. Increasing the 1,4-cis content to more than 95 percent, for example, by using cobalt-containing mixed catalysts, seems to have only a slight effect in overcoming the difficulties of processing such polymers.

According to this invention an improved polybutadiene that can be easily processed without blending with other elastomers and that leads to products of excellent technological properties is provided by polymerizing 1,3-butadiene in the presence of catalysts which have been obtained by the reaction of (a) a titanium-III-β-dicarbonyl compound with (b) iodomonohalides and/or iodine or mixtures of bromine and iodine with at least 30 mol percent of iodine and (c) an aluminium alkyl compound. The proportions of the above components must be so chosen that 1 to 10 mols of halogen compound or halogen or halogen mixture and 1 to 20 mols of alkyl aluminium compound are used for each mol of titanium compound.

By titanium-III-β-dicarbonyl compounds are to be understood compounds of the general formula

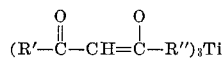

where R' and R" are aliphatic, araliphatic or aromatic hydrocarbon radicals. Examples are: Titanium-III-acetylacetonate, titanium-III-benzoylacetonate, titanium-III-1,5-diphenyl-acetylacetonate. The preparation of these compounds has been described in German Auslegeschrift 1,081,880.

Alkyl aluminium compounds are compounds of the general formula AlR'R"R''' in which R', R" and R''' are aliphatic, preferably saturated or cycloaliphatic hydrocarbon radicals with 1 to 12 carbon atoms although R' and R" may also represent hydrogen, that is to say both aluminuium trialkyls and mono or dialkyl-aluminium hydrides may be used. It is advantageous to use aluminium-alkyls containing alkyl radicals with 2 to 4 carbon atoms.

Suitable alkyl compounds for the manufacture of the catalyst combinations to be used according to the invention are, for example: $Al(C_2H_5)_3$, $Al(iso-C_4H_9)_3$, $Al(n-C_3H_7)_3$, $Al(iso-C_8H_{17})_3$, $Al(n-C_{12}H_{23})_3$, $Al(iso-C_4H_9)H_2$.

Iodomonohalide components which may be used for preparing the mixed catalysts according to the invention are iodomonochloride and iodomonobromide or mixtures thereof. Iodine or mixtures of iodine and bromine with more than 30 mol percent of iodine may be used instead of these iodomonohalides or mixed with them. If desired, the above mentioned components may be mixed consecutively instead of simultaneously.

Catalysts particularly suitable for the present process are obtained by choosing the proportions of the starting components for the mixed catalyst so that 1 to 8 mols of iodomonochloride or iodomonobromide or 1 to 8 mols of iodine or 1 to 8 mols of a mixture of bromine and iodine with at least 30 mol percent of iodine are used for 1 mol of titanium-III-β-dicarbonyl compound and the molar quantity of alkyl aluminium compound used lies within the limits given by the following relationship:

$$a = (b+4) \pm 3.5$$

where $a$=the molar quantity of alkyl aluminium compound and $b$=the molar quantity of iodomonochloride or iodomonobromide or iodine or a mixture of bromine and iodine with at least 30 mol percent of iodine used. It is in general more advantageous to use the above mentioned iodine halides and their mixtures with iodine and with iodine-bromine mixtures for preparing the polymerization catalysts instead of elementary iodine because this generally leads to higher yields of polymer.

The catalysts are prepared in aliphatic or aromatic solvents that may be used for carrying out the polymerization (see below) with exclusion of air and moisture, in some cases in the presence of inert gases or vapours of solvents. A solution of the titanium-III-β-dicarbonyl compound is combined with the halogen compound or the halogen or the halogen mixture and a solution of the alkyl aluminium compound.

In a preferred method of carrying out the process, the titanium-III-β-dicarbonyl compound is first reacted with the halogen component and the alkyl aluminium compound is added subsequently. At temperatures of about 0 to 50° C., the catalyst is obtained in the form of a blackish brown solution or suspension. Paraffin oil or hydrogenated diesel oil are found to be suitable solvents for the alkyl aluminium compounds, because such solutions largely inhibit a reaction of the alkyl aluminium compounds with air and moisture.

The monomeric butadiene to be used for the process of the present invention should not contain more than 0.01 percent of 1,2-butadiene and not more than 0.01 to 0.015 percent of acetylenes. Greater quantities of substances which react with the catalyst and render it ineffective, such as water, oxygen, carbon monoxide or 1,2-butadiene and acetylenes must be removed before polymerization or destroyed by adding a greater amount of alkyl aluminium compounds so that the composition of the catalysts of the invention remains unchanged.

The polymerization by the present process may be carried out within a temperature range of —50 to +80° C. It is preferable to use a temperature range of 0 to +50°

C. Polymerization may be carried out at normal, reduced or excess pressure. Polymerization may be carried out in the presence of inert gases such as nitrogen, helium or argon or under the vapour pressure of the solvent used.

The catalysts are used in such concentrations that 0.015 to 5 parts by weight, preferably 0.05 to 2 parts by weight of titanium-III-$\beta$-dicarbonyl compound are present for 100 parts by weight of butadiene.

Aliphatic and cycloaliphatic hydrocarbons as well as aromatic hydrocarbons or their mixtures are particularly suitable as solvents for the manufacture of the catalysts. Examples of these solvents are butane, hexane, octane, light petroleum, ligroin, hydrogenated diesel oil, cyclohexane, methylcyclohexane, benzene, toluene, xylene or methyl naphthalene. The solvents should not contain any substances which may react with the catalyst and deactivate it.

The catalysts according to the invention may be used for discontinuous or continuous butadiene polymerization. For discontinuous operation, it is particularly advantageous to use autoclave with stirrers which make it possible to work with the exclusion of air and moisture. Continuous polymerization may be carried out in a worm in front of which further polymerization vessels may be connected, or in a suitable tubular system.

The recovery of the polymers, the deactivation and, if necessary, removal of the catalyst may be carried out by treatment with lower alcohols, water, acetone or mixtures of these substances, in some cases with addition of organic and/or inorganic acids or bases. The substances may be used in such quantities that precipitation of the polymer does not occur at first and is only effected after subsequent addition of a larger quantity of a lower aliphatic alcohol such as methanol, ethanol, isopropanol etc. Moreover, stabilizers and antioxidants such as phenyl-$\beta$-naphthylamine, N',N'-diphenyl-p-phenylenediamine, di-tertiary-butyl-p-cresol, di-tertiary-butyl-hydroquinone, tri-(nonylphenyl)-phosphate and buffers such as calcium stearate may be added in the course of recovering the product.

Paraffinic and naphthenic mineral oils as well as phenol aldehyde resins and alkyd resins may also be added during the process.

The butadiene polymers that may be prepared by the above process differ from the previously known polybutadienes in that their behaviour is similar to that of natural rubber. They are distinguished from the previously known types of polybutadienes by their high self-adhesiveness, and in the crude state they have a film strength similar to that of natural rubber. The high film strength is present also in the non-vulcanized mixtures obtained from the raw material. The polymers are very suitable for treatment on a roller and an internal mixer. They form excellent sheets on rollers over a wide range of temperature, whereas the previously known polybutadiene types produce very poor quality sheets and only at temperatures below 40 to 50° C.

Mixtures prepared from the polymers of the invention have an excellent capacity for taking up fillers at all temperatures that occur industrially in practice when working on a technical scale, and excellent distribution of fillers and high adhesiveness to materials. The excellent properties of the polybutadienes prepared by the present process are in particular manifested by the fact that these polybutadienes need not be blended with other elastomers.

In the following examples, the parts given are parts by weight.

EXAMPLE 1

A catalyst solution is prepared in a vessel with stirrer, with exclusion of air and moisture, as follows: 0.71 part of titanium-III-acetylacetonate dissolved in a small quantity of benzene, and 0.52 part of iodomonochloride in the form of a hexane solution and 3.24 parts of aluminium triisobutyl are added to 250 parts of cyclohexane with stirring. The brownish black catalyst solution is cooled to 0° and a solution of 100 parts of butadiene in 250 parts of cyclohexane is then added. Polymerization begins shortly, as indicated by the rise in temperature and the increase in the viscosity of the solution. The internal temperature is kept to 5 to 10° C. Polymerization is complete after 8 hours. The polymer is then stirred with a small quantity of methanol to which 3% of a phenolic stabilizer and an amino alcohol have been added, and the polymer is then precipitated by further addition of methanol. The polymer is dried in vacuo at 50 to 60° C. 85 parts of a polybutadiene are obtained which is easily soluble in toluene and has an $\eta$-value of 3.5 and contains 77.6 percent 1,4-cis, 3.5 percent 1,4-trans and 18.9 percent 1,2-links.

The properties of the raw materials are similar to those of natural rubber, i.e. the polybutadiene has good adhesiveness and considerable film strength.

EXAMPLE 2

Further polymerization experiments were carried out under the same conditions as in Example 1 but with varying concentrations of catalyst. In each case, 100 parts of butadiene, 0.7 part of titanium-III-actylacetonate and 500 parts of cyclohexane were used. The polymers obtained showed excellent sheet formation at temperatures between 30 and 120° C.

| No. of Experiment | Parts of iodomonochloride | Al(iso-$C_4H_9$)$_3$ parts | $\eta$-Value | Yield | Infra red spectrum | | |
|---|---|---|---|---|---|---|---|
| | | | | | cis-1,4 | trans- | |
| | | | | | | 1,4 | 1,2 |
| 1 | 1.62 | 3.24 | 2.7 | 100 | 60.4 | 22.5 | 17.1 |
| 2 | 1.94 | 3.24 | 3.6 | 100 | 61.5 | 21.5 | 17.0 |
| 3 | 0.57 | 1.98 | 2.5 | 65 | 69.2 | 7.0 | 23.8 |

EXAMPLE 3

In the following polymerization experiments, iodomonobromide or mixtures of iodine and bromine were used instead of iodomonochloride; the bromine and iodine could be added consecutively if desired. The polymerization and recovery of the product were carried out as in Example 1. In each case, 100 parts of butadiene, 500 parts of cyclohexane and 0.7 part of titanium-III-acetylacetonate were used.

In all the experiments, the polymers obtained had very good self-adhesiveness and considerable film strength.

| No. of Experiment | Parts of iodine/bromine | Al(iso-C$_4$H$_9$)$_3$ | Structure | | | $\eta$-Value | Yield |
|---|---|---|---|---|---|---|---|
| | | | cis-1,4 | trans- | | | |
| | | | | 1,4 | 1,2 | | |
| 1 | 0.633/0.398 | 2.97 | 67.0 | 15 | 18 | 2.9 | 100 |
| 2 | 1.26/0.795 | 2.95 | 63.7 | 24.8 | 11.5 | 3.2 | 100 |
| 3 | 0.758/0.476 | 2.95 | 70.9 | 20.4 | 8.6 | 3.1 | 100 |
| 4 | 1.52/0.954 | 2.98 | 74.5 | 16.6 | 8.9 | 3.05 | 82 |
| | Parts of iodiomonbromide | | | | | | |
| 5 | 1.23 | 2.97 | 59.4 | 28.4 | 12.2 | 2.9 | 90 |
| 6 | 2.46 | 3.56 | 71.8 | 1.8 | 26.4 | 2.8 | 95 |

EXAMPLE 4

The two polymerization experiments which are described below were carried out by the same method as described in Example 1, using Al(C$_2$H$_5$)$_3$ and AlH$_2$(iso-C$_4$H$_9$). In each case, 0.71 part of titanium-III-acetylacetonate, 100 parts of butadiene and 500 parts of cyclohexane were used. The butadiene polymers obtained showed good sheet formation on rollers even at elevated temperatures and the properties of the raw material were similar to those of natural rubber.

| | Parts of iodomonochloride | Parts of Al(C$_2$H$_5$)$_3$ | Structure | | | $\eta$-Value | Yield |
|---|---|---|---|---|---|---|---|
| | | | cis-1,4 | trans- | | | |
| | | | | 1,4 | 1,2 | | |
| 1 | 1.62 | 1.82 | 65.3 | 23.9 | 10.8 | 2.2 | 90 |
| | | Parts of AlH$_2$ (iso-C$_4$H$_9$) | | | | | |
| 2 | 1.62 | 1.41 | 69.2 | 3.2 | 27.6 | 2.25 | 94 |

EXAMPLE 5

A catalyst composed of 0.814 part of titanium-III-benzoylacetonate, 1.62 parts of iodomonochloride and 3.24 parts of Al(iso-C$_4$H$_9$)$_3$ was prepared in 250 parts of cyclohexane under the usual conditions. 110 parts of butadiene dissolved in 250 parts of cyclohexane were added to this solution. 90 parts of polybutadiene having a $\eta$-value of 3.5 and the following structure: cis-1,4=75.2 percent, trans-1,4=13.1 percent, 1,2=11.7 percent were obtained.

The polymer had good film strength and very good self-adhesiveness.

EXAMPLE 6

The following polymerization experiments were carried out under the reaction conditions described in Example 1 and using iodine as the halogen component. In each case, 500 parts of cyclohexane and 0.69 part of titanium-III-acetylacetonate were used. The polymers obtained had good film strength and self adhesiveness.

EXAMPLE 7

Larger quantities of the polybutadiene according to the invention were prepared according to Experiments 1 and 2 indicated in Example 2 to test the technological properties and compare the properties with other polybutadiene types.

*Properties of the raw material*

Polybutadiene according to the invention: Mooney—plasticity ML 4'100°=40. Reaction to rolling: smooth pelt at 20°, 70° and 110°. Good film strength and adhesiveness. Polybutadiene prepared with TiI$_4$/AlR$_3$ catalyst: Mooney—ML 4'100°=43. Reaction to rolling: smooth pelt at 20°, crumbling at 70°, 110°. Very low film strength, low adhesiveness.

Polybutadiene prepared with lithium catalyst:

Mooney—ML 4'100°=35

Reaction to rolling: crumbling at 20°, 70°, 110°; no pelt formation. Very low film strength and adhesiveness.

*Preparation of a mixture*

| | Parts |
|---|---|
| Polybutadiene | 100 |
| Stearic acid | 1.5 |
| Zinc oxide | 5.0 |
| HAF carbon black | 48.0 |
| Plasticizer (aromatic mineral oil) | 10.0 |
| Adhesifier (colophony) | 5.0 |
| Fatigue resisting agent (p-phenylene-diamine derivative) | 0.75 |
| Age resister (phenyl-$\alpha$-naphthylamine) | 0.75 |

| | Parts of butadiene | Parts of iodine | Parts of Al(iso-C$_4$H$_9$)$_3$ | Parts of polymer | $\eta$-Value | Structure | | |
|---|---|---|---|---|---|---|---|---|
| | | | | | | cis-1,4 | trans- | |
| | | | | | | | 1,4 | 1,2 |
| 1 | 130 | 0.508 | 1.98 | 102 | 5.0 | 85.1 | 1.7 | 13.2 |
| 2 | 150 | 2.54 | 3.75 | 106 | 2.5 | 74.7 | 10.7 | 14.6 |

| | Parts |
|---|---|
| Paraffin | 0.6 |
| Sulfur | 1.8 |
| Accelerator (N - mercaptobenzothiazole - sulphenamide) | 0.9 |

| | Polybutadiene according to the invention | Polybutadiene TiI₄/AlR₃ |
|---|---|---|
| Temperature of rolling, ° | 60–70 | 35–40 |
| Behaviour of mixture | (1) | (2) |
| Distribution of filler | (3) | (4) |
| Adhesiveness to material (1=very adhesive, 5=non-adhesive) | 2–3 | 5 |
| Vulcanization rate (optimum vulcanization at 4.0 atmospheres excess pressure (=151° C.) measured in vulcameter) | 20′ | 30′ |
| Properties of vulcanisate: | | |
| Tensile strength (kg./cm.²) | 158 | 140 |
| Elongation (percent) | 590 | 545 |
| Hardness (Shore) | 59 | 62 |
| Rebound | 51 | 51 |
| Tear resistance (kg. abs, 4 mm.) | 20 | 13 |
| Heat built up (Goodrich flexometer ° C. after 25′) | 53 | 54 |
| Abrasion resistance DIN (mm.³) | 18 | 46 |

¹ Very good.
² Mixture crumbles and drops from the roller.
³ Good.
⁴ Poor.

EXAMPLE 8

The following catalyst solution is prepared in a vessel with stirrer with exclusion of air and moisture:

0.7 part of titanium-III-acetylacetonate is dissolved in 500 parts of toluene (water content 0.001 to 0.005 percent), whereupon 1.27 parts of iodine and 3.16 parts of aluminium triisobutyl are added. The blackish-brown catalyst solution is cooled to 0° C. and 140 parts of butadiene are then introduced. Polymerization begins at once and is completed after 3 to 4 hours at a polymerization temperature of 4 to 9° C. After recovering the polymer as in Example 1, 140 parts of an elastic polybutadiene with high film strength are obtained.

The η-value is 3.0 and the structure has the following composition: cis-content 80.6 percent, trans-content 6.1 percent, 1,2-content 13.3 percent. A similar polybutadiene having a η-value of 2.7 and a structure containing 77.9 percent 1,4-cis, 15.2 percent 1,4-trans and 6.9 percent 1,2-links is obtained under the same conditions with a catalyst composed of 0.7 part of titanium-III-acetylacetonate, 2.5 parts of iodine and 4.0 parts of Al(iso-C₄H₉)₃

EXAMPLE 9

(a) 0.68 part of titanium-III-acetylacetonate, 1.62 parts of iodomonochloride and 3.95 parts of Al(iso-C₄H₉)₃ are added in succession to 550 parts of toluene at 0° C. with exclusion of air and moisture. 100 parts of butadiene are introduced into the blackish-brown catalyst solution. Polymerization is complete after 4 to 5 hours at 4 to 8° C. After recovery as in Example 1, 100 parts of polybutadiene with very good film strength and considerable self-adhesiveness are obtained. η-Value 2.5. Structure: cis=73.4 percent; trans=12.9 percent; 1,2=13.7 percent.

(b) As in 9(a), a catalyst solution is prepared at −4° C. by adding 0.68 part of titanium-III-acetylacetonate, 3.9 parts of Al(iso-C₄H₉)₃ and 1.60 parts of iodomonochloride in this sequence. A 100 percent yield of polybutadiene is obtained from 110 parts of butadiene after 4 to 5 hours at a polymerization temperature of 5 to 8° C. The polybutadiene has the following properties: Film strength and adhesiveness. η-Value=2.1 (gel content 5 content 7 percent); structure: cis=67.4 percent; trans =17.8 percent; 1,2=14.8 percent.

(c) A catalyst solution is prepared at −2° C. in 500 ml. toluene by adding 4.0 parts of Al(iso-C₄H₉)₃, 1.62 parts of iodomonochloride and 0.7 part of titanium-III-acetylacetonate in this sequence. 130 parts of butadiene are used. The polymerization takes 4 to 5 hours at a polymerization temperature of 4 to 9° C. The polybutadiene obtained in a yield of 70 percent has good film strength and adhesiveness. η-Value=2.1 (gel content 5 percent); structure: cis=69 percent; trans=15.7 percent; 1,2=15.3 percent.

EXAMPLE 10

A number of polymerizations were carried out under the same conditions as in Example 9(a), using iodobromide and iodomonochloride. The catalysts are prepared with 0.7 part of titanium-III-acetylacetonate in 500 parts of toluene at 0 to 5° C., 100 parts of butadiene being used for polymerization in each case. Polymerization is generally carried out for 3 to 6 hours at 4 to 10° C. The polymers have good film strength and adhesiveness.

| Experiment No. | Parts of iodomonochloride | Parts of Al(iso-C₄H₉)₃ | η-Value | Yield, percent | Structure | | |
|---|---|---|---|---|---|---|---|
| | | | | | cis | trans | 1,2 |
| 1 | 1.32 | 4.0 | 2.9 | 91 | 87.3 | 5.8 | 6.9 |
| 2 | 0.49 | 2.77 | 3.4 | 75 | 76.0 | 1.9 | 22.1 |
| 3 | 0.97 | 4.0 | 2.6 | 100 | 80.2 | 6.0 | 13.8 |
| | Parts of iodomonobromide | | | | | | |
| 4 | 2.1 | 4.1 | 3.7 | 68.5 | 78.2 | 2.8 | 18.9 |

We claim:

1. The process for the manufacture of an improved rubbery polybutadiene comprising polymerizing 1,3-butadiene in the presence of a catalyst prepared by combining (a) a titanium-III-β-dicarbonyl compound represented by the formula $$(R'-\overset{O}{\overset{\|}{C}}-CH=\overset{O}{\overset{|}{C}}-R'')_3Ti$$

wherein each of R′ and R″ is a member of the group consisting of lower alkyl, aralkyl and aryl radicals, (b) a halogen selected from the group consisting of iodine, iodomonochloride, iodomonobromide and mixtures of iodine and bromine with at least 30 mol percent of iodine and (c) an organic compound of aluminium having the valence linkages bound to members selected from the group consisting of hydrogen, saturated acyclic hydrocarbon radicals and saturated cyclic hydrocarbon radicals, the mol ratio of the halogen to the titanium-III-β-dicarbonyl compound ranging from about 1:1 to about 10:1 and the mol ratio of the organic compound of aluminium to the titanium-III-β-dicarbonyl compound is about 1:1 to about 20:1; and carrying out the polymerization of said 1,3-butadiene in an inert hydrocarbon diluent at a temperature between about −50° and about +80° C.; and recovering the polymer from solution.

2. The process of claim 1, in which the titanium-III-β-dicarbonyl compound is titanium-III-acetyl acetonate.

3. The process of claim 1, in which the halogen is iodine.

4. The process of claim 1, in which the halogen is a mixture of iodine and bromine.

5. The process of claim 1, in which the halogen is iodomonochloride.

6. The process of claim 1, in which the halogen is iodomonobromine.

7. The process of claim 1, in which the organic compound of aluminium is aluminium-triisobutyl.

8. The process of claim 1, in which the organic compound of aluminium is aluminium-triethyl.

9. The process for the manufacture of an improved rubbery polybutadiene comprising polymerizing 1,3-butadiene in the presence of a catalyst prepared by combining (a) a titanium-III-β-dicarbonyl compound represented by the formula

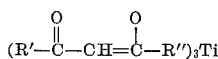

wherein each of R′ and R″ is a member of the group consisting of lower alkyl, aralkyl and aryl radicals, (b) a halogen selected from the group consisting of iodine, iodomonochloride, iodomonobromide and mixtures of iodine and bromine with at least 30 mol percent of iodine and (c) an organic compound of aluminium having the valence linkages bound to members selected from the group consisting of hydrogen, saturated acyclic hydrocarbon radicals and saturated cyclic hydrocarbon radicals, the mol ratio of the halogen to the titanium-III-β-dicarbonyl compound ranging from about 1:1 to about 10:1, the molar quantity of the organic compound of aluminium in relation to the molar quantity of the halogen being defined by the formula $a=(b+4)\pm 3.5$, wherein $a$ stands for the molar quantity of the organic compound of aluminium and $b$ for the molar quantity of the halogen, the titanium-III-β-dicarbonyl compound being present in an amount from about 0.015 to 5 parts by weight per 100 parts by weight of 1,3-butadiene, and carrying out the polymerization of said 1,3-butadiene in an inert hydrocarbon diluent at a temperature between about −50° and about +80° C.; and recovering the polymer from solution.

10. The process of claim 1 wherein said rubbery polybutadiene consists predominantly of cis-1,4-polybutadiene.

11. The process of claim 9 wherein said rubbery polybutadiene consists predominantly of cis-1,4-polybutadiene.

References Cited by the Examiner
FOREIGN PATENTS

| | | |
|---|---|---|
| 221,121 | 3/1959 | Australia. |
| 591,994 | 12/1960 | Belgium. |
| 664,389 | 6/1963 | Canada. |
| 1,081,880 | 10/1960 | Germany. |
| 1,091,105 | 5/1960 | Germany. |
| 1,259,291 | 3/1961 | France. |

OTHER REFERENCES

Natta et al.: Rubber and Plastics Age, volume 42, April 1961, pages 402–409.

Z. Naturwissenschaften, 45 (1958), page 286.

J. Chem. Phys., 27 (1957), pages 1298–1304.

JOSEPH L. SCHOFER, *Primary Examiner.*

E. J. SMITH, *Assistant Examiner.*